United States Patent [19]
Arends et al.

[11] Patent Number: 5,360,659
[45] Date of Patent: Nov. 1, 1994

[54] TWO COMPONENT INFRARED REFLECTING FILM

[75] Inventors: Charles B. Arends; Walter J. Schrenk; Ray A. Lewis; Ravi Ramanathan; John Wheatley, all of Midland, Mich.

[73] Assignee: The Dow Chemical Company, Midland, Mich.

[21] Appl. No.: 65,416

[22] Filed: May 24, 1993

[51] Int. Cl.$^5$ .............................. B32B 9/00; G02B 5/28
[52] U.S. Cl. ...................................... 428/216; 428/30; 428/412; 428/220; 428/442; 428/522; 428/913; 428/918; 428/702; 359/359; 359/589
[58] Field of Search .............. 428/702, 412, 30, 212, 428/216, 220, 442, 522, 913, 918; 359/359, 589

[56] References Cited

U.S. PATENT DOCUMENTS

| | | |
|---|---|---|
| 3,247,392 | 4/1966 | Thelen . |
| 3,432,225 | 3/1969 | Rock . |
| 3,711,176 | 1/1973 | Alfrey, Jr. et al . |
| 3,759,647 | 9/1973 | Schrenk et al. . |
| 3,773,882 | 11/1973 | Schrenk . |
| 3,884,606 | 5/1975 | Schrenk . |
| 4,229,066 | 10/1980 | Rancourt et al . |
| 5,032,461 | 7/1991 | Shaw et al. . |
| 5,103,337 | 4/1992 | Schrenk et al. . |
| 5,122,906 | 6/1992 | Wheatley et al. . |
| 5,126,880 | 6/1992 | Wheatley et al. . |
| 5,217,794 | 6/1993 | Schrenk . |
| 5,233,465 | 8/1993 | Wheatley et al. . |
| 5,269,995 | 12/1993 | Ramanathan et al. . |

OTHER PUBLICATIONS

J. Affinito, "Extremely High Rate Deposition of Polymer Multilayer Optical Thin Film Materials" Jan. 4, 1991.
Radford et al, "Reflectivity of Iridescent Coextruded Multilayered Plastic Films", Polymer Engineering and Science, May, 1973, vol. 13, No. 3.
Ohmer, "Design of Three-Layer Equivalent Films", J. of Optical Society of America, vol. 68(1), 137 139 (Jan. 1978).
Thelen, "Multilayer Filters with Wide Transmittance Bands", J. of the Optical Soc. of America, vol. 83, No. 11.

*Primary Examiner*—P. C. Sluby

[57] ABSTRACT

The present invention provides a two-component infrared reflecting film which reflects light in the infrared region of the spectrum while suppressing second, third and fourth order reflections in the visible spectrum. The film comprises alternating layers of first (A) and second (B) diverse polymeric materials having a six layer alternating repeat unit with relative optical thicknesses of about .778A.111B.111A.778B.111A.111B. The polymeric materials differ from each other in refractive index by at least about 0.03.

33 Claims, 2 Drawing Sheets

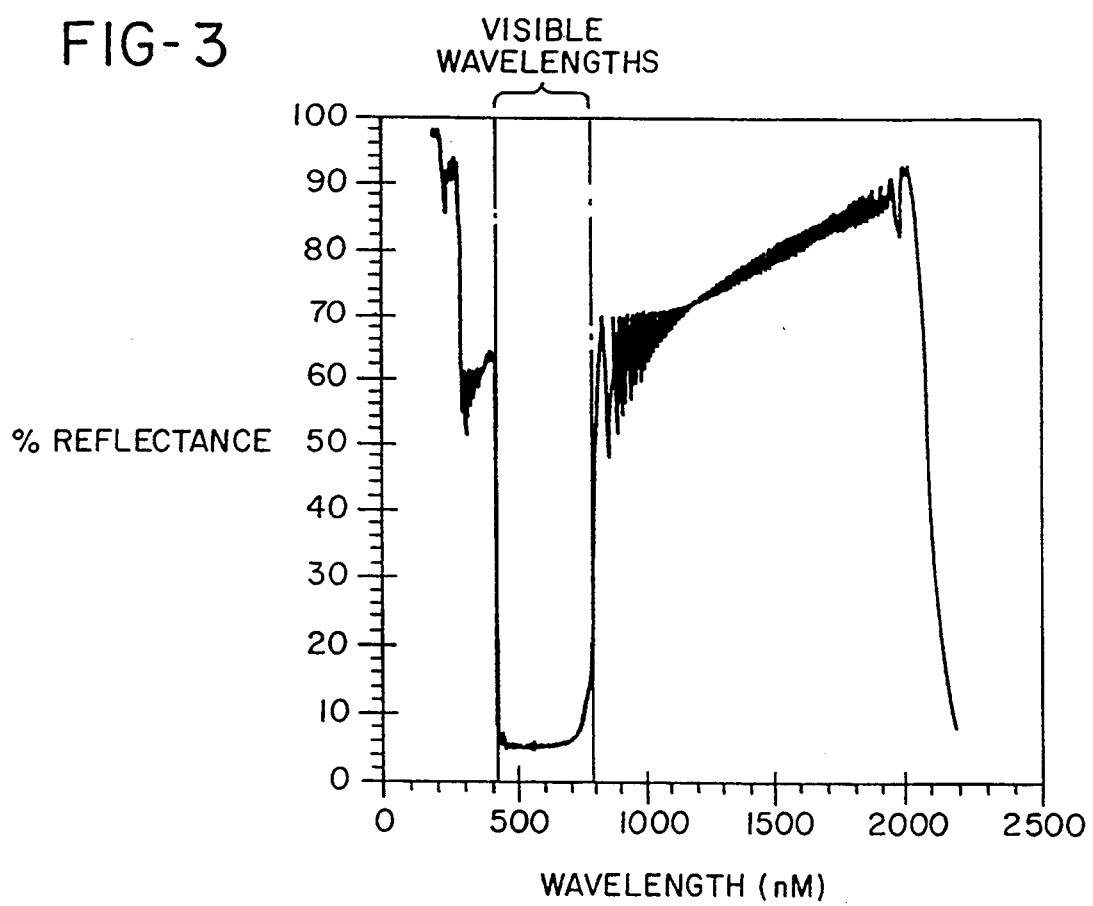

TWO COMPONENT INFRARED REFLECTING FILM

BACKGROUND OF THE INVENTION

The present invention relates to a two component infrared reflecting film, and more particularly to two component films which reflect light in the infrared region of the spectrum while suppressing second, third and fourth order reflections in the visible region of the spectrum.

Coextruded multilayer films have been made which comprise multiple alternating layers of two polymers with individual layer thicknesses of 100 nanometers or less. Such multilayer films are described, for example, in Alfrey et al, U.S. Pat. No. 3,711,176. When polymers are selected to have a sufficient mismatch in refractive indices, these multilayer films cause constructive interference of light. This results in the film transmitting certain wavelengths of light through the film while reflecting other wavelengths. The multilayer films can be fabricated from relatively inexpensive and commercially available polymer resins having the desired refractive index differences. The films have the further advantage in that they may be shaped or formed into other objects.

The reflection and transmission spectra for a particular two-component film are primarily dependent on the optical thickness of the individual layers, where optical thickness is defined as the product of the actual thickness of the layer times its refractive index. The intensity of light reflected from such films is a function of the number of layers and the differences in refractive indices of the polymers. Mathematically, the wavelength of the dominant, first order wavelength for reflected light (at normal incidence) is:

$$\lambda_I = 2 \sum_{i=1}^{k} (n_i d_i)$$

where $\lambda_I$ is the first order wavelength, n is the refractive index of the polymer, and d is the layer thickness of the polymer, and k is the number of polymer components. Films can be designed to reflect infrared, visible, or ultraviolet wavelengths of light depending on the optical thickness of the layers. When designed to reflect infrared wavelengths of light, such prior art films also exhibit higher order appearance for the films. Mathematically, higher order reflections will appear at $$\lambda_m = (2/m) \sum_{i=1}^{k} (n_i d_i)$$

where m is the order of the reflection (e.g. 2, 3, 4, etc.) As can be seen, higher order reflections appear at fractions of the first order reflection. The films produced in accordance with the above mentioned Alfrey patent exhibit iridescence and changing colors as the angle of incident light on the film is changed.

For some applications, while reflection of infrared wavelengths is desirable, higher order reflections of visible light are not. For example, infrared reflecting films can be laminated to glass in buildings and automobiles to reduce air conditioning loads. The films may also be laminated to other substantially transparent plastic materials to reflect infrared wavelengths. However, the films must be substantially transparent to visible light so that the vision of those looking through the glass or plastic is not impaired.

It is possible to suppress some higher order reflections (i.e., reduce their intensity) by proper selection of the ratio of optical thicknesses in two component multilayer films. See, Radford et al, "Reflectivity of Iridescent Coextruded Multilayered Plastic Films", *Polymer Engineering and Science*, vol. 13, No. 3, May 1973. This ratio of optical thicknesses is termed "f-ratio", where f $= n_1 d_1/(n_1 d_1 + n_2 d_2)$. However, such two component films do not suppress successive second, third and fourth order visible wavelengths.

Other workers have designed optical coatings comprising layers of three or more materials which are able to suppress certain higher order reflections. For example, Thelen, U.S. Pat. No. 3,247,392, describes an optical coating used as a band pass filter reflecting in the infrared and ultraviolet regions of the spectrum. The coating is taught to suppress second and third order reflectance bands. However, the materials used in the fabrication of the coating are metal oxide and halide dielectric materials which must be deposited in separate steps using expensive vacuum deposition techniques. Also, once deposited, the coatings and the substrates to which they are adhered cannot be further shaped or formed. Further, the coatings are subject to chipping, scratching, and/or corrosion and must be protected. Finally, because vacuum deposition techniques must be used, it is both expensive and difficult to fabricate coatings which cover large surface areas.

Rock, U.S. Pat. No. 3,432,225, teaches a two component, four layer antireflection coating which utilizes specified thicknesses of the first two layers of the coating to synthesize an equivalent layer having an effective index of refraction which is intermediate that of the first two layers. However, Rock also uses metal halides, oxides, sulfides, and selenides which must be deposited in separate processing steps using vacuum deposition techniques.

Another technique has been suggested for a three-layer film comprised of two components which is equivalent in refractive index and optical thickness to a film comprised of three components. The third component is eliminated by synthesizing a three layer structure which has the same optical performance as a three component structure. See Ohmer, "Design of three-layer equivalent films", *Journal of the Optical Society of America* Vol. 68 (I), 137 (January 1978). However, Ohmer also uses vacuum deposition of metal oxides, halides, and selenides. Further, such a structure does not provide sufficient suppression of the fourth order reflectance band, thus hindering its optical performance.

Rancourt et al, U.S. Pat. No. 4,229,066 teaches a visible light transmitting, infrared reflecting multilayer coating utilizing metal halide sulfides and selenides. The materials have either a high or low index of refraction and must be deposited in separate steps using vacuum deposition techniques. In addition, Rancourt requires 10 layers in the repeat unit. Further, the coatings of Rancourt et al cannot be further shaped or formed after deposition.

Schrenk et al, U.S. Pat. No. 5,103,337, describes an all polymeric three-component optical interference film formed by coextrusion techniques which reflects infrared light while suppressing second, third and fourth order reflections in the visible region of the spectrum.

However, the polymers in the film are required to have closely defined refractive indexes, which limits the choice of polymers which may be used. In addition, the production of the film requires separate extruders for each of the polymeric components.

Accordingly, the need still exists in this art for a two-component film which reflects infrared light, successfully suppresses multiple successive higher order reflections to prevent unwanted reflections in the visible range, allows a wide choice of polymers, and does not require complicated extrusion equipment.

SUMMARY OF THE INVENTION

The present invention meets that need by providing a two-component polymeric infrared reflecting film which reflects wavelengths of light in the infrared region of the spectrum while suppressing second, third, and fourth order wavelengths which occur in the visible range.

The terms "reflective", "reflectivity", "reflection", and "reflectance" as used herein refer to total reflectance (i.e., ratio of reflected wave energy to incident wave energy) of a sufficiently specular nature. The use of these terms is intended to encompass semi-specular or diffuse reflection as well. In general, reflectance measurement refers to reflectance of light rays into an emergent cone with a vertex angle of 15 degrees centered around the specular angle. By the term "diverse" we mean that the polymeric materials need not differ in any respect except in terms of refractive index. Thus, while adjacent layers may be chemically diverse, if such materials have the same refractive index, then for purposes of the present invention they are not "diverse".

A specific intensity of reflectance, when used herein, is the intensity of reflection which occurs at a wavelength where no substantial absorption occurs. For example, in a preferred embodiment of the invention, the film is designed to reflect infrared light having wavelengths in the range from about 770-2000 nm. Light of other wavelengths, such as in the visible range, pass through (i.e., are transmitted by) the film. It is at the infrared wavelengths to which the intensity of reflection is referring.

According to one aspect of the present invention, a two component infrared-reflecting film is provided which reflects light in the infrared wavelength region of between about 770-2000 nm while suppressing second, third and fourth order reflections in the visible wavelength region of between about 380-770 run. The film comprises alternating layers of first (A) and second (B) diverse polymeric materials having a six layer alternating repeat unit with relative optical thicknesses of about .778A.111B.111A.778B.111A.111B.

In an alternative embodiment of the invention, the two component film comprises a first portion of alternating layers comprising the six layer alternating layer repeating unit with relative optical thicknesses of about 778A.111B.111A.778B.111A.111B, and a second portion of alternating layers having a repeating unit AB. In one preferred form, the layers in the second portion of the film have substantially equal optical thicknesses. In this embodiment, the first portion of alternating layers reflects infrared light of wavelengths between about 1200-2000 run, while the second portion of alternating layers reflects infrared light of wavelengths between about 770-1200 nm.

Preferably, at least 50% of visible light between about 380-770 nm incident on the film is transmitted and at least 50% of infrared light of wavelengths of between about 770-2000 nm is reflected. In other preferred embodiments of the invention, at least 80% of visible light incident on the film is transmitted and at least 80% of infrared light incident on the film is reflected.

Preferably, the polymeric materials differ from each other in refractive index by at least about 0.03. In a preferred embodiment, the first polymeric material is polycarbonate and the second polymeric material is polymethyl methacrylate, the materials having a refractive index mismatch of about 0.1.

The layers in the film preferably have a repeat unit gradient so that the film reflects a broad bandwidth of wavelengths in the infrared range. By repeat unit gradient, we mean a change in the thickness of the layers across the thickness of the body so that there is a difference in the thickness between the thinnest and thickest repeat unit in the multilayer stack. The gradient may be any regular function including, but not limited to, a linear function, a logarithmic function, a quartic function, or a quartic function superimposed on a linear gradient.

In the embodiment of the invention which includes first and second portions of alternating layers, the first portion of alternating layers preferably has a repeat unit gradient of 5/3:1, and the second portion of alternating layers preferably has a repeat unit gradient of about 1.5:1.

The two component infrared reflecting films of the present invention may find use in areas where infrared reflective properties are desired. For example, the films of the present invention may be laminated to glass used in buildings and automobiles to reflect infrared radiation, thus lowering the heating loads. Further, the films may also be laminated to other substantially transparent plastics to provide infrared reflective properties. For example, windshields and canopies on certain aircraft are fabricated from tough polymeric resins. Laminating the optical interference film of the present invention to, or incorporating the film into, such protective layers would provide protection from infrared radiation while still providing substantial transparency to light in the visible region of the spectrum. The films themselves, as well as the plastics to which they are laminated may be shaped or post-formed into a variety of useful objects. Because the films suppress successive higher order reflections in the visible region of the spectrum, the films have a high transmission in the visible region.

Through the use of a broad-band reflective multilayer polymeric film or a suitable broad-band reflective metal oxide or halide coating in combination with the infrared-reflecting film of the present invention, the film is also capable of masking iridescent color reflected from the infrared-reflecting layers as taught in commonly assigned Wheatley et al U.S. patent application Ser. No. 07/888,705, filed May 27, 1992. now U.S. Pat. No. 5,233,456, issued Aug. 3, 1993. By "masking", it is meant that means are provided to reflect and/or refract light to interfere with the observance of iridescent visible color. For example, the color masking means may comprise a masking film which reflects light substantially uniformly over the visible portion of the spectrum.

The color masking film may be located on one or both of the major surfaces of the polymeric film or between interior layers of the film. Preferably, the color masking film is laminated to the polymeric film. Alternatively, it may be coextruded therewith. The color masking means may also comprise a substantially colorless metal oxide or metal halide film having sufficient broad band reflectance in the visible range to mask the iridescent color effects of the infrared reflecting film. Such a metal oxide or halide film is preferably deposited on the film by conventional coating techniques such as pyrolysis, powder coating, chemical vapor deposition, vacuum coating, or cathode sputtering. The metal oxide or halide film may be located on one or both of the major surfaces of the polymeric film or between interior layers of the film. A preferred metal oxide film is tin oxide.

Accordingly, it is an object of the present invention to provide a two-component infrared reflecting film which reflects light in the infrared region of the spectrum, suppresses successive higher order reflections of visible wavelengths, and is fabricated using relatively inexpensive materials. These, and other objects and advantages of the present invention, will become apparent from the following detailed description, the accompanying drawings, and the appended claims.

BRIEF DESCRIPTION OF THE DRAWINGS

FIG. 3 is a calculated graph of wavelength versus reflectance for a two-component infrared reflecting film when fabricated in accordance with the present invention.

DETAINED DESCRIPTION OF THE PREFERRED EMBODIMENTS

Figure 1:
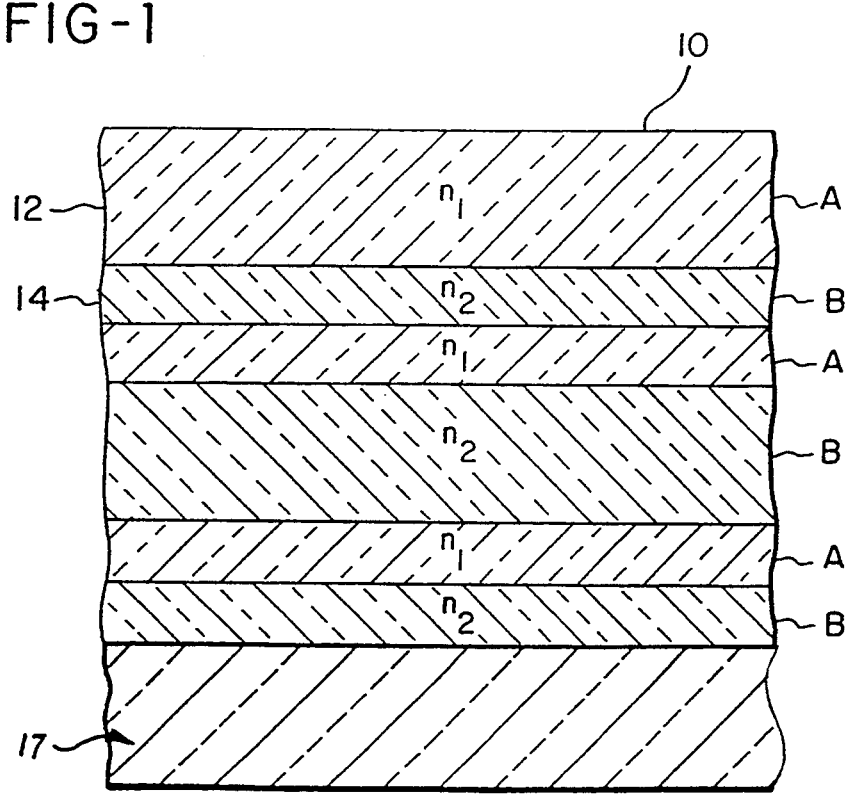
FIG. 1 is a schematic cross section of the two-component infrared reflecting film of the present invention.

The present invention provides improved two component infrared reflecting films with a number of desirable properties including broadband infrared reflectivity, the capability of suppressing successive second, third, and fourth order reflections, and the substantial absence of undesirable iridescence. The use of only two components in the film provides an advantage over three component films in that compatibility between polymers is more readily achieved as polymers do not have to be chosen based on their refractive indices, but rather on the difference in their refractive indices. Eliminating the need for a third polymer component greatly simplifies the selection of the polymers and also simplifies the extrusion apparatus which is needed.

The optical theory of multiple reflections from layers having differing refractive indices demonstrates the dependency of the effect on both individual layer thickness and difference in the refractive indices of the materials. See, Radford et al, "Reflectivity of Iridescent Coextruded Multilayered Plastic Films", 13 *Polymer Engineering and Science* 216 (1973). The primary or first order reflected wavelength (for normal incidence) for a two component multilayer film is given by the Equation below.

$$\lambda_I = 2(n_1 d_1 + n_2 d_2)$$

where, $\lambda_I$ is the wavelength of first order reflection in nanometers, $n_1$ and $n_2$ are the refractive indices of the two polymers, and $d_1$ and $d_2$ are the layer thicknesses of the two polymers, also in nanometers.

As can be seen, the first order reflected wavelength is proportional to the sum of the optical thicknesses of the two polymers (where optical thickness, $n_i d_i$, is the product of layer thickness times refractive index). In addition to first order reflections, higher order reflections occur at integer fractions of the first order.

Higher order reflections will occur at a wavelength $$\lambda_m 2/m \, (n_1 d_1 + n_2 d_2)$$

where $\lambda_m$ is the mth order reflected wavelength and d is the layer thickness, both in nanometers, and m is the order of reflection (m=1,2,3,4,5, etc.). The relative intensity of these higher order reflections depends on the ratio of the optical thicknesses of the polymer components. As taught by Radford et al, by controlling the optical thickness ratios in a two component system, different order reflections may be enhanced while others are suppressed. However, prior art two component interference films have not been able to suppress successive second, third and fourth order visible wavelengths simultaneously. Such films which are designed to reflect strongly in the near infrared region of the spectrum will exhibit unwanted reflectivity in the visible region of the spectrum because of higher order reflections.

However, in accordance with the present invention, a two component film having a six layer alternating repeating unit suppresses the unwanted second, third, and fourth order reflections in the visible wavelength region of between about 380–770 nm while reflecting light in the infrared wavelength region of between about 770–2000 nm. Reflections higher than fourth order will generally be in the ultraviolet, not visible, region of the spectrum or will be of such a low intensity as to be unobjectionable.

The film comprises alternating layers of first (A) and second (B) diverse polymeric materials in which the six layer alternating repeat unit has relative optical thicknesses of about .778A.111B.111A.778B.111A.111B. The use of only six layers in the repeat unit results in more efficient use of material and simpler manufacture than previous designs.

A repeat unit gradient may be introduced across the thickness of the film. Thus, in one embodiment of the invention, the repeat unit thicknesses will increase linearly across the thickness of the film. By linearly, it is meant that the repeat unit thicknesses increase at a constant rate across the thickness of the film.

In some embodiments, it may be desirable to force the repeat unit optical thickness to double from one surface of the film to another. The ratio of repeat unit optical thicknesses can be greater or less than two as long as the short wavelength range of the reflectance band is above 770 nm and the long wavelength edge is about 2000 nm.

Other repeat unit gradients may be introduced by using logarithmic and/or quartic functions. We have found that a logarithmic distribution of repeat unit thicknesses will provide nearly constant reflectance across the infrared band.

In an alternative embodiment of the invention, the two component film may comprise a first portion of alternating layers comprising the six layer alternating layer repeating unit which reflects infrared light of wavelengths between about 1200–2000 nm. and a second portion of alternating layers having an AB repeat unit and substantially equal optical thicknesses which reflect infrared light of wavelengths between about 770–1200 nm. Such a combination of alternating layers results in reflection of light across the infrared wavelength region through 2000 nm. Preferably, the first portion of the alternating layers has a repeat unit gradient of about 5/3:1, and the second portion of alternating layers have a layer thickness gradient of about 1.5:1.

FIG. 1 schematically illustrates a two component infrared reflective film 10 having a six layer alternating repeat unit 778A.111B.111A.778B.111A.111B in accordance with the present invention. The film 10 includes alternating layers of first polymer 12 having a refractive index, $n_1$, and a second polymer 14 having a refractive index, $n_2$. As previously described, the infrared reflecting film may be laminated to a substantially transparent substrate 17, such as a polymer or glass. In an alternative embodiment of the invention, substrate 17 may be a color masking film such as that taught in copending, commonly assigned Wheatley et al, U.S. application Ser. No. 07/888,705, filed May 27, 1992 now U.S. Pat. No. 5,233,465, issued Aug. 3, 1993, disclosure of which is incorporated by reference. The color masking film reflects light substantially uniformly over the visible portion of the spectrum, and may be located on one or both of the major surfaces of the polymeric film or between interior layers of the film. Preferably, the color masking film is laminated to the polymeric film as shown in FIG. 1. Alternatively, it may be coextruded therewith. The color masking film may also comprise a substantially colorless metal oxide or metal halide film having sufficient broad band reflectance in the visible range to mask the iridescent color effects of the infrared reflecting film. Such a metal oxide or halide film is preferably deposited on the film by conventional coating techniques such as pyrolysis, powder coating, chemical vapor deposition, vacuum coating, or cathode sputtering. The metal oxide or halide film may be located on one or both of the major surfaces of the polymeric film or between interior layers of the film. A preferred metal oxide film is tin oxide.

Figure 2:
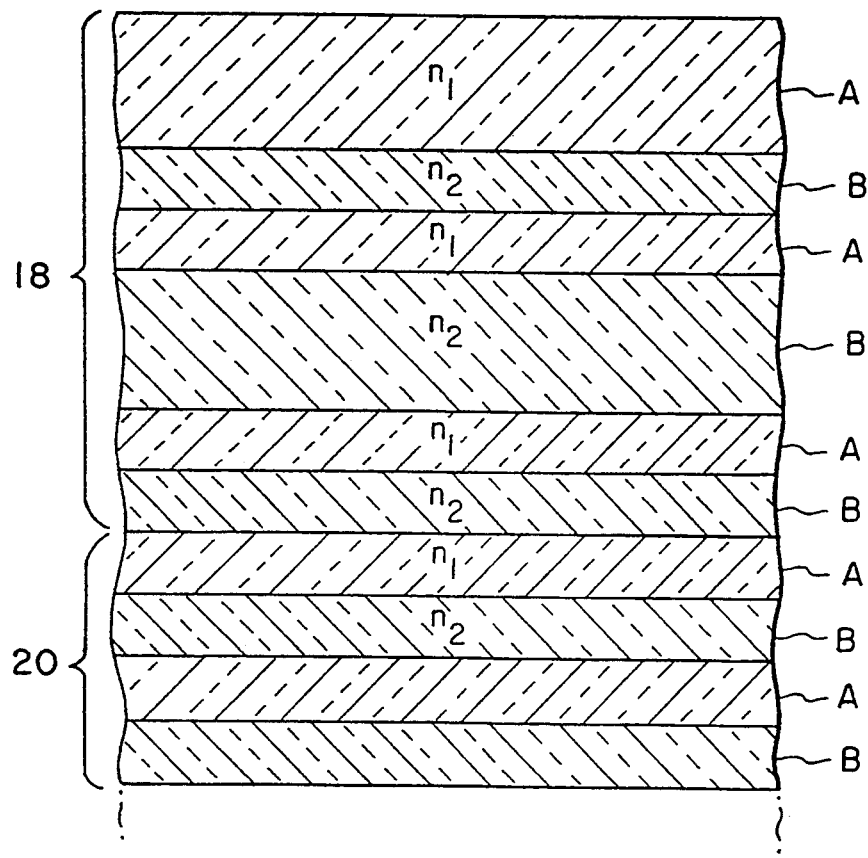
FIG. 2 is a schematic cross section of an alternative embodiment of the present invention.

FIG. 2 illustrates an alternative embodiment of the invention including a first portion of alternating layers 18 comprising the six layer alternating repeat unit and a second portion of alternating layers 20 having a repeating unit AB. It should be appreciated that the order of the first and second portions of alternating layers may be varied as desired.

Preferably, the polymers chosen have a refractive index mismatch of at least 0.03. A preferred two component film includes polycarbonate as the first polymeric material and polymethyl methacrylate as the second polymeric material. It is preferred that the polymers selected have compatible rheologies for coextrusion. That is, as a preferred method of forming the two component infrared reflecting films is the use of coextrusion techniques, the melt viscosities of the polymers must be reasonably matched to prevent layer instability or nonuniformity. The polymers used also should have sufficient interfacial adhesion so that the films will not delaminate.

Multilayer bodies in accordance with the present invention are most advantageously prepared by employing a multilayered coextrusion device as described in U.S. Pat. Nos. 3,773,882 and 3,884,606, the disclosures of which are incorporated herein by reference.

One method of providing the necessary 7:1 ratio of layer thicknesses for the six layer optical repeat unit is to group a series of repeating eighteen feedslot feedports in the device of Schrenk, U.S. Pat. No. 3,884,606. Thus, seven slots may be used for the A polymer, one slot for the B polymer, one slot for A, seven slots for B, one slot for A, and one slot for B, with the pattern repeating around the feed ring. Because of the large number of feedslots allocated for a repeating unit, additional layer manipulation may be required to increase the total number of layers as will be explained below.

Another method for providing the necessary 7:1 ratio of layer thicknesses is to use only six feed slots per optical repeat unit, but control the volumetric ratios of the polymer melt streams entering those feed slots through the use of precisely controlled gear pumps. Gear pump speed may be controlled to feed a 7:1 pumping ratio into separate manifolds in the feed block.

Protective boundary layers may be added to the multilayer bodies by an apparatus as described in commonly-assigned copending U.S. patent application Serial No. 07/955,788 filed Oct. 2, 1992, now U.S. Pat. No. 5,269,995, issued Dec. 14, 1993, to Ramanathan et al entitled, "Improved Control of Protective Boundary Layer", the subject matter of which is hereby incorporated by reference. Such coextrusion devices provide a method for preparing multilayered, simultaneously extruded thermoplastic materials, each of which are of a substantially uniform layer thickness. To increase the total number of layers in the multilayer body, preferably a series of layer multiplying means as are described in U.S. Pat. Nos. 5,094,793 and 5,094,788, the disclosures of which are incorporated herein by reference may be employed. The layer multiplying means are termed interfacial surface generators, or ISG's.

Layer thickness gradients may be introduced into the two component film by controlling the volume of heat plastified polymers passing through the feed ports of the co-extrusion device as taught in Schrenk, U.S. Pat. No. 3,687,589. Alternatively, the layer thickness gradients may be introduced upstream or downstream of the interfacial surface generators by the use of adjustable valves to control the amount of heat plastified polymer introduced at the various feed slots to the ISG's. In yet another alternative method for introducing a layer thickness gradient into the two component film, a temperature gradient may be imposed on the feedblock to the co-extrusion device.

In operation, the feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final film. Optionally, this multilayered stream may be subsequently passed through a series of layer multiplying means (i.e., ISG's) in order to further increase the number of layers in the final film.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered film in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the film after extrusion are all factors which affect the thickness of the individual layers in the final film.

The feedblock of the coextrusion device delivers a designed thickness gradient of repeat units to the ISG's to achieve substantially uniform broadband reflectance for the film. The feedblocks may be designed, as taught in the above-mentioned patents, to deliver layer thickness distributions which fit a quartic function. Such a quartic function, when superimposed on a linear gradient distribution produces a redundancy in layers having substantially the same thickness. This redundancy is desirable as it compensates for any flaws or inconsistencies in the layers by placing groups of layers at different locations within the reflective film which reflect in the same wavelength region.

The two-component infrared reflecting films of the present invention find a number of uses. For example, they may find use in areas where infrared reflective properties are desired. The films of the present invention may be laminated to glass used in buildings and automobiles to reflect infrared radiation, thus lowering the heating loads. Further, the films may also be laminated to other substantially transparent plastics to provide infrared reflective properties. For example, windshields and canopies on certain aircraft are fabricated from tough polymeric resins. Laminating the optical interference film of the present invention to, or incorporating the film into, such protective layers would provide protection from infrared radiation while still providing substantial transparency to light in the visible region of the spectrum.

The films themselves, as well as the plastics to which they are laminated may be shaped or post-formed into a variety of useful objects. Because the films suppress successive higher order reflections in the visible region of the spectrum, no iridescence or other undesirable color effects are present.

In order that the invention may be more readily understood, reference is made to the following example, which is intended to be illustrative of the invention, but is not intended to be limiting in scope.

EXAMPLE

To demonstrate the infrared reflecting capabilities of the film of the present invention, a computer simulation was run to predict the reflectance characteristics of a two-component polymethyl methacrylate/polycarbonate multilayer film having 2496 layers. The simulation used a software program entitled "Macleod Thin Film Optics" available from Kidger Optics, Sussex, England. A refractive index mismatch of 0.1 was assumed based on the actual mismatch of the two polymers (refractive indices of 1.59 and 1.49, respectively) when measured at visible wavelengths.

As can be seen from FIG. 3, the 2496 layer design produced a reflectance in the infrared range which varied from about 60% at 770 nm to 90% at about 2000 nm. This high reflectance over such a wide range of wavelengths is attributable to the repeat unit gradient which was imposed. Again, the film was essentially transparent to visible light.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A two component infrared reflecting film comprising alternating layers of first (A) and second (B) diverse polymeric materials, said first and second polymeric materials differing in refractive index by at least about 0.03, wherein said first and second polymeric materials have a six alternating layer repeating unit with relative optical thicknesses of about .778A.111B.111A.778B.1-11A.111B, wherein at least 50% of visible light of wavelengths of between about 380-770 nm incident on said film is transmitted and at least 50% of infrared light of wavelengths of between about 770-2000 nm is reflected.

2. The two component film of claim 1 in which said first polymeric material is polycarbonate and said second polymeric material is polymethyl methacrylate.

3. The two component film of claim 1 in which there is a repeat unit gradient across the thickness of said film.

4. The two component film of claim 3 in which said repeat unit gradient is a linear function.

5. The two component film of claim 3 in which said repeat unit gradient is a logarithmic function.

6. The two component film of claim 3 in which said repeat unit gradient is a quartic function.

7. The two component film of claim 3 in which said repeat unit gradient is a quartic function superimposed on a linear gradient.

8. The two component film of claim 3 in which said repeat unit gradient is any regular function.

9. The two component film of claim 1 wherein at least 80% of visible light incident on said film is transmitted.

10. The two component film of claim 1 wherein at least 80% of infrared light incident on said film is reflected.

11. The two component film of claim 1 wherein said film is laminated to a substantially transparent substrate comprising a polymer or glass.

12. The two component film of claim 1 wherein said film is laminated to a color masking film.

13. The two component film of claim 12 wherein said color masking film comprises a metal oxide film.

14. A two component infrared reflecting film which reflects light in the infrared wavelength region of between about 770-2000 nm while suppressing second, third, and fourth order reflections in the visible wavelength region of between about 380-700 nm, said film comprising alternating layers of first (A) and second (B) diverse polymeric materials, said first and second polymeric materials differing in refractive index by at least about 0.03, wherein said first and second polymeric materials have a six alternating layer repeating unit with relative optical thicknesses of about .778A.111B.1-11A.778B.111A.111B.

15. The two component film of claim 14 in which said first polymeric material is polycarbonate and said second polymeric material is polymethyl methacrylate.

16. The two component film of claim 14 in which there is a repeat unit gradient across the thickness of said film.

17. The two component film of claim 16 in which said repeat unit gradient is a linear function.

18. The two component film of claim 16 in which said repeat unit gradient is a logarithmic function.

19. The two component film of claim 16 in which said repeat unit gradient is a quartic function.

20. The two component film of claim 16 in which said repeat unit gradient is a quartic function superimposed on a linear gradient.

21. The two component film of claim 14 wherein said film is laminated to a substantially transparent substrate comprising a polymer or glass.

22. The two component film of claim 14 wherein said film is laminated to a color masking film.

23. The two component film of claim 22 wherein said color masking film comprises a metal oxide film.

24. A two component infrared reflecting film in which at least 50% of visible light between about 380–770 nm incident on said film is transmitted and at least 50% of infrared light of wavelengths between about 770–2000 nm is reflected, said film comprising alternating layers of first (A) and second (B) diverse polymeric materials differing in refractive index by at least about 0.03, wherein a first portion of said alternating layers comprises a six alternating layer repeating unit with relative optical thicknesses of about .778A.111B.111A.778B.111A.111B and reflects infrared light of a wavelength between about 1200–2000 nm; and wherein a second portion of said alternating layers having a repeating unit AB reflects infrared light of a wavelength between about 770–1200 nm.

25. The two component film of claim 24 wherein said first polymeric material is polycarbonate and said second polymeric material is polymethyl methacrylate.

26. The two component film of claim 24 wherein said first portion of said alternating layers has a repeat unit gradient of about 5/3:1.

27. The two component film of claim 24 wherein said second portion of said alternating layers has a repeat unit gradient of about 1.5:1.

28. The two component film of claim 24 wherein said alternating layers in said second portion of said film have substantially equal optical thicknesses.

29. The two component film of claim 24 wherein at least 80% of visible light incident on said film is transmitted.

30. The two component film of claim 24 wherein at least 80% of infrared light incident on said film is reflected.

31. The two component film of claim 24 wherein said film is laminated to a substantially transparent substrate comprising a polymer or glass.

32. The two component film of claim 24 wherein said film is laminated to a color masking film.

33. The two component film of claim 32 wherein said color masking film comprises a metal oxide film.

* * * * *